United States Patent [19]

Bastioli et al.

[11] Patent Number: 5,002,990
[45] Date of Patent: Mar. 26, 1991

[54] QUICKLY CRYSTALLIZING POLYESTER COMPOSITIONS

[75] Inventors: Catia Bastioli, Novara; Vittorio Bellotti, Fontaneto D'Agogna; Nello Gazzarata, Vercelli, all of Italy

[73] Assignee: Montefibre S.p.A., Milan, Italy

[21] Appl. No.: 315,569

[22] Filed: Feb. 27, 1989

[30] Foreign Application Priority Data

Mar. 29, 1988 [IT] Italy ............................. 19575 A/88

[51] Int. Cl.⁵ .................... C08K 5/15; C08K 5/10; C08K 5/16
[52] U.S. Cl. .................... 524/114; 524/155; 524/171; 524/196; 524/199; 524/240; 524/288; 524/290; 524/359; 524/392; 524/368; 524/400; 524/605
[58] Field of Search ............... 524/114, 288, 290, 368, 524/199, 196, 400, 605, 392, 171, 155, 359, 392, 240

[56] References Cited

U.S. PATENT DOCUMENTS

| | | | |
|---|---|---|---|
| 3,516,957 | 6/1970 | Gray et al. ............... | 524/315 |
| 3,595,818 | 7/1971 | Weissermel et al. ...... | 524/114 |
| 4,344,874 | 8/1982 | Akagi et al. ............. | 524/296 |
| 4,351,751 | 9/1982 | Kishida et al. .......... | 524/605 |
| 4,351,757 | 9/1982 | Hoeschele .............. | 524/296 |
| 4,362,839 | 12/1982 | Tonoki et al. ............ | 524/605 |
| 4,365,036 | 12/1982 | Lee ....................... | 524/299 |
| 4,438,233 | 3/1984 | Lee ....................... | 524/368 |
| 4,440,889 | 4/1984 | Hergenrother et al. ... | 524/143 |
| 4,536,531 | 8/1985 | Ogawa et al. ............ | 524/400 |
| 4,548,978 | 10/1985 | Garrison .................. | 524/605 |
| 4,558,085 | 12/1985 | Lee ........................ | 524/299 |
| 4,795,771 | 1/1989 | Yoshihara ................ | 524/114 |

FOREIGN PATENT DOCUMENTS 2418255 9/1979 France.
60-96645 5/1988 Japan.

Primary Examiner—Veronica P. Hoke
Attorney, Agent, or Firm—Morgan & Finnegan

[57] ABSTRACT

Quickly crystallizing polyester compositions containing as nucleating agent a compound having the formula:

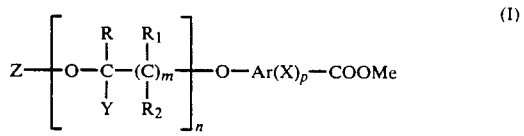

wherein:
Me is an alkali metal or alkaline-earth metal;
X is a group selected from $-CH_2-$, $-CO-$, $-CH_2-CO-$, and $-CH(CH_3)-CO-$;
p is 0 or 1;
Ar is a single or condensed aromatic ring, or Ar represents 2 or more aromatic nuclei linked either by a simple bond or by an $-O-$, $-S-$, $-SO_2-$, $-SO-$, $-CO-$, $-CS-$, or $-NH-$ group;
R, $R_1$, $R_2$ may be, independently of each other, H, a linear or branched $C_1-C_6$ alkyl radical, optionally substituted with halogen atoms or $C_1-C_6$ alkoxy groups;
Y is H or $-CH_3$;
m is 1 when Y is $-CH_3$, or a number from 1 to 5 when Y=H;
n is a number from 1 to 500; and
Z is $-H$, a $C_1-C_{18}$ alkyl, benzyl, allyl, glycidyl, acetyl, $-CO-NH-R_3$ or $-CO-NH-R_4-NCO$ group.

16 Claims, No Drawings

QUICKLY CRYSTALLIZING POLYESTER COMPOSITIONS

BACKGROUND OF THE INVENTION

1. Field of the Invention

This invention relates to polyester compositions suitable for injection molding. More particularly, the invention relates to compositions based on linear and saturated polyesters which, after addition of nucleating and plasticizing agents, make it possible to obtain high crystallization rates even when operating with water-heated molds.

2. Discussion of the Prior Art

Saturated linear thermoplastic polyesters such as PET, its blends and copolymers, are produced on a wide scale at comparatively low cost and they show, in their crystalline state, excellent physical properties consistently with a high melting point.

The formulations based on the aforesaid polyesters, however, can be scarcely applied in the field of injection molding, mainly because of the difficulties in obtaining conveniently crystallized articles when using the usual molds. A non-modified PET crystallizes very slowly in the melted state, making the process uneconomical and producing articles having a crystalline structure of non-homogeneous spherolitic type, low impact strength, and a rough surface.

The processing of said PET requires high molding temperatures, and long residence times in the mold are required in order to obtain dimensionally stable pieces. In fact, an early extraction of a piece from the mold, not sufficiently crystallized, can involve a further crystallization with time, with subsequent change in the volume and possible distortion of the shape.

From a practical point of view, it is desirable to obtain satisfactory properties as to the crystallization rate by resorting to the usual water-heated molds.

Additives known to the prior art make it possible profitably to increase the crystallization rate in the melted state of the polyesters. These additives, however, affect only in a secondary way the temperature of cold crystallization, a parameter determining the lowest limit of the molding temperature. In fact, in the case of non-modified PET, the cold crystallization peak, measured by a differential calorimeter, presents its maximum at the temperature of 135° C and when nucleating agents of the saline type (sodium benzoate, sodium o-chlorobenzoate and the like) are added to said PET, such temperature is lowered only a little (130° C).

Examples of such formulations are described, for instance, in the following patents or patent applications: U.S. Pat. No. 3,516,957; JP-71/029,977; DE-2,014,770; DE-1,945,967; and DE-1,945,101.

It is known that in order to influence significantly the cold crystallization temperature of a resin, as well as the glass transition temperature of the amorphous phase, it is necessary to use plasticizers.

The patent literature teems, in this connection, with references citing the use of the usual plasticizers in combination with PET. It is generally a question of aliphatic esters of phthalic, adipic or sebacic acids or of aliphatic and aromatic esters of phosphoric acid.

Such compositions are described for instances in the following patents or patent applications: U.S. Pat. No. 4,344,874; U.S. Pat. No. 4,440,889; and JP-83/049747.

These classes of plasticizers, particularly developed for PVC, do not show, however, sufficient interaction with the polyester resin both as to the miscibility (the formation of separate phases is observed) and as to the effectiveness (scanty influence on the glass transition temperature (Tg), on the viscosity of the melted product, on the modulus, and so on). Only a few aromatic esters, having a low molecular weight, and the polyoxyalkyleneglycols show some degree of interaction with the resin. Among the first compounds neopentyl glycol dibenzoate is generally the most frequently used, but the use is also described of diethylene glycol dibenzoate, triethylene glycol dibenzoate, glyceryl tribenzoate, and the like. Examples of such compositions are described, among others in U.S. Pat. No. 4,440,889 and U.S. Pat. No. 4,344,874. This class of products, owing to their low boiling point, gives rise during the processing, however, to plentiful as well as undesired formation of smokes. More interesting from this point of view is the use of polyethers of the polyoxyalkylene-glycol type.

The patent literature teems with references relating to polyester compositions containing a nucleating agent and a plasticizing agent of the polyoxyalkylene-glycol type.

For instance, JP-A-84/157,144 describes the nucleation and plasticization of PET by means of Na stearate and of polyoxyethylene glycol-lauryl-glycidyl-ether. JP-A-84/24,747, on the contrary, describes the use of a copolymer ethylenemethacrylic acid, salified with Na in combination with polyoxyethylene glycol dimethyl ether, in order to improve the molding of PET, JP-A-57/143,384 describes a polyester composition modified by the addition of polyoxyethylene glycol diphthalate disodium salt. U.S. Pat. No. 4,365,036 describes a nucleating agent based on a complex between NaI and polyoxyethylene glycol. U.S. Pat. No. 4,558,085, on the contrary, describes a nucleant based on a complex between polyoxyethylene glycol and sodium salts of aliphatic acids. However, by using these additives no satisfactory result can be achieved, especially as far as molding is concerned.

DISCLOSURE OF THE INVENTION

In accordance with the present invention, it has now been discovered that the aforesaid problems are solved by using an additive combining in a single structure a saline function having a nucleating action and a polyoxyalkylene sequence.

Therefore, the present invention consists or consists essentially in quickly crystallizing polyester compositions suitable for processing in the usual water-heated molds, comprising a thermoplastic polyester resin and a nucleating agent, characterized in that the nucleating agent is selected from the salts or mixtures of salts of organic acids having the formula (I):

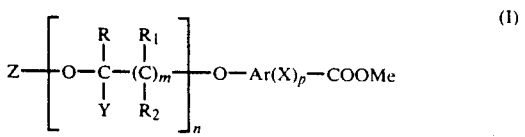

wherein:

Me is an alkali metal or alkaline-earth metal;
X is a group selected from

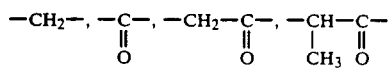

p is 0 or 1;

Ar is a single or condensed aromatic ring having from 6 to 14 carbon atoms, which may also be substituted with halogen atoms, $C_1$–$C_8$ alkyl groups, $C_1$–$C_8$ alkoxy groups, nitro groups, or Ar represents 2 or more aromatic nuclei, each of them having from 6 to 14 carbon atoms, linked either by a single bond or by an —O—, —S—, —$SO_2$—, —SO—, —CO—, —CS—, or —NH— group;

R, $R_1$, $R_2$, independently of each other, are H, a linear or branched $C_1$–$C_6$ alkyl group, optionally substituted with halogen atoms or $C_1$–$C_6$ alkoxy groups;

Y is H or —$CH_3$;

m is 1 when Y is —$CH_3$, or a whole number ranging from 1 to 5 (independently in each instance) when Y=H;

n is a numbering from 1 to 500 (independently in each instance); and

Z is —H, a $C_1$–$C_{18}$ alkyl, benzyl, allyl;

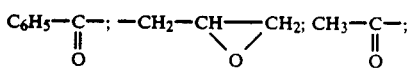

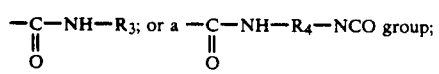

wherein $R_3$ is a non-substituted phenyl group or a phenyl group substituted with halogen atoms or a $C_{10}$–$C_{40}$ alkyl group and $R_4$ is a non-substituted phenylene group or a phenylene group substituted with halogen atoms or a $C_{10}$–$C_{40}$ alkylene group.

The compounds having the formula (I) are prepared by the usual methods starting from an ester of the acid:

$$HO-Ar(X)_pCOOH \qquad (II)$$

wherein Ar, X and p have the meanings specified above, by reaction in an autoclave with an alkylene oxide suitable for this purpose, in the presence of alkali at a temperature of 130° C. and at a pressure of 3 atmospheres.

Then the thus-obtained product is saponified by means of an alkali metal hydroxide, to obtain the salt of the acid.

Afterwards, the OH end-groups of the polyoxyalkylene chains are made functional by known techniques.

The advantage resulting from the use of the products having formula (I), resides in that, besides obtaining the required degree of plasticization, the polyoxyalkylene chain, soluble in the resin, promotes a better dispersion of the nucleating agent with the formation of a homogeneous microcrystalline structure. Moreover the extremity of the polyoxyalkylene chain with alcoholic termination, made functional by ether, ester, urethane, epoxy, or allyl groups, makes possible a wide variety of uses, according to the desired applications and to the required final properties.

A few examples of nucleating agents of formula (I) which may be profitably used in the compositions of the present invention are those where Z, Y, m, n, Ar, X and Me have the following meanings, R, $R_1$ and $R_2$ being equal to H.

| | Z | Y | m | n | Ar | X* | Me |
|---|---|---|---|---|---|---|---|
| (1) | H | H | 1 | about 20 |  | - | Na |
| (2) | H | $CH_3$ | 1 | about 20 | 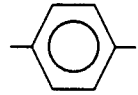 | - | Na |
| (3) | $CH_2$—CH—$CH_2$ (epoxide) | H | 1 | about 90 | 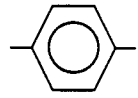 | - | Na |
| (4) | $CH_2$—CH—$CH_2$ (epoxide) | $CH_3$ | 1 | about 90 |  | - | Na |
| (5) | C(=O)—$CH_3$ | H | 1 | about 90 | 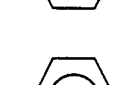 | - | Na |
| (6) | C(=O)—$CH_3$ | $CH_3$ | 1 | about 90 | 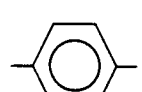 | - | Na |

-continued

| | Z | Y | m | n | Ar | X* | Me |
|---|---|---|---|---|---|---|---|
| (7) | C(=O)-C₆H₅ (benzoyl) | H | 1 | about 9 | phenylene | - | Na |
| (8) | C(=O)-C₆H₅ (benzoyl) | CH₃ | 1 | about 90 | phenylene | - | Na |
| (9) | CH₃ | H | 1 | about 90 | phenylene | - | Na |
| (10) | CH₃ | CH₃ | 1 | about 90 | phenylene | - | Na |
| (11) | C₂H₅ | H | 1 | about 90 | phenylene | - | Na |
| (12) | C₂H₅ | CH₃ | 1 | about 90 | phenylene | - | Na |
| (13) | C₃H₇ | H | 1 | about 90 | phenylene | - | Na |
| (14) | C₃H₇ | CH₃ | 1 | about 90 | phenylene | - | Na |
| (15) | CH₂-C₆H₅ (benzyl) | H | 1 | about 90 | phenylene | - | Na |
| (16) | CH₂-C₆H₅ (benzyl) | CH₃ | 1 | about 90 | phenylene | - | Na |
| (17) | C(=O)-NH-C₁₈H₃₇ | H | 1 | about 20 | phenylene | - | Na |
| (18) | C(=O)-NH-C₁₈H₃₆-NCO | H | 1 | about 20 | phenylene | - | Na |
| (19) | H | H | 1 | about 20 | chlorophenylene | - | Na |

-continued
| | Z | Y | m | n | Ar | X• | Me |
|---|---|---|---|---|---|---|---|
| (20) | H | H | 1 | about 20 | 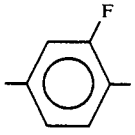 | - | Na |
| (21) | H | H | 1 | about 20 | 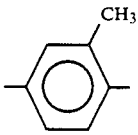 | - | Na |
| (22) | H | H | 1 | about 20 | 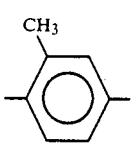 | - | Na |
| (23) | H | H | 1 | about 20 | 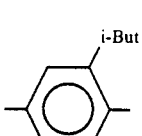 | - | Na |
| (24) | H | H | 1 | about 20 | 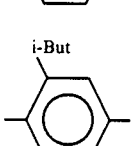 | - | Na |
| (25) | H | H | 1 | about 20 | 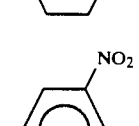 | - | Na |
| (26) | H | H | 1 | about 20 | 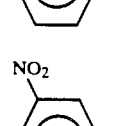 | - | Na |
| (27) | H | H | 1 | about 20 | 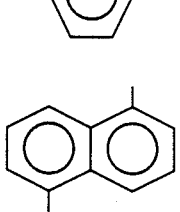 | - | Na |
| (28) | H | H | 1 | about 20 | 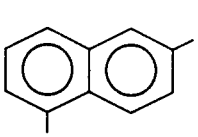 | - | Na |
| (29) | H | H | 1 | about 20 | 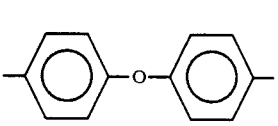 | - | Na |
| (30) | H | H | 1 | about 20 | 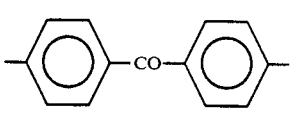 | - | Na |

-continued

| | Z | Y | m | n | Ar | X* | Me |
|---|---|---|---|---|---|---|---|
| (31) | H | H | 1 | about 20 | —C₆H₄—S—C₆H₄— | - | Na |
| (32) | H | H | 1 | about 20 | —C₆H₄—SO₂—C₆H₄— | - | Na |
| (33) | H | H | 1 | about 20 | —C₆H₄—CS—C₆H₄— | - | Na |
| (34) | H | H | 1 | about 20 | —C₆H₄—NH—C₆H₄— | - | Na |
| (35) | —CH₂—CH(O)CH₂— (epoxide) | H | 1 | about 90 | —C₆H₄— | CO | Na |
| (36) | H | H | 1 | about 20 | —C₆H₄— | CO | Na |
| (37) | CH₂—CH(O)—CH₂ (epoxide) | H | 1 | about 90 | —C₆H₄— | —CH₂—CO— | Na |
| (38) | H | H | 1 | about 20 | —C₆H₄— | —CH₂—CO— | Na |
| (39) | CH₂—CH(O)—CH₂ (epoxide) | H | 1 | about 90 | —C₆H₄— | —CH(CH₃)—CO— | Na |
| (40) | H | H | 1 | about 20 | —C₆H₄— | —CH(CH₃)—CO— | Na |
| (41) | H | H | 2 | about 20 | —C₆H₄— | - | Na |
| (42) | H | H | 3 | about 20 | —C₆H₄— | - | Na |
| (43) | H | H | 1 | about 20 | —C₆H₄— | —CH₂— | Na |

*= Hyphen (-) relates to the case in which P = O, namely when X represents a simple bond.

The compounds of formula (I) in which Ar is

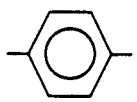

and p=0, R, $R_1$ and $R_2$ being H and m=1, namely all the compounds of formula (I) derived from hydroxybenzoic acid and from polyoxyethylene or polyoxypropylene chains, are particularly preferred for the purposes of the present invention.

The nucleating agent may be added to the polyester resin:
1. directly, in amounts depending on its molecular weight, but, however, not above 30% by weight with respect to the resin; or
2. after having mixed therewith, in the melted state, nucleating agent and polyester resin, in order to obtain a master batch. The master batch may be obtained by the usual compounding, adding the nucleating agent having formula (I) in concentrations which may be very high, i.e., up to 50% by weight.

In the first case (direct addition) the nucleating agent is admixed with the resin in the melted state, in amounts ranging from 0.1 to 30% by weight, depending on the molecular weight and the metal content in the nucleating agent and preferably from 0.2 to 15% by weight.

In the case of a master batch nucleation, one adds master amounts ranging from 1 to 50% by weight, and preferably from 2 to 20% by weight.

The nucleating agents of the present invention having formula (I) may be introduced into the polyester, in order to obtain the corresponding compositions, by any conventional method concerning the introduction of additives into melted masses of polyester, for instance by a compounding in mixers, extruders and the like. The polyester resin is generally selected from the group consisting of polyethylene terephthalate, polybutylene terephthalate, their mixtures or copolymers, polyethylene terephthalate modified by introduction of polyalkylene, polyarylate or polycarbonate segments.

The quickly crystallizing polyester compositions of the present invention are characterized by high crystallization temperatures, homogeneity in the distribution, and low concentration of the nucleating agents.

Inert fillers may be added to said compositions, such as glass, carbon, boron fibers and the like, inorganic particles of glass, mica, zeolites, graphite, talc and the like, organic fibers of aramide or polyacrylonitrile type, and the like.

Furthermore the usual additives and/or auxiliary substances may be added to the composition, if necessary or desired, in order to improve the characteristics concerning thermal and oxidative stability as well as fastness to light as well as other additives such as pigments, dyes, flame retardants, releasing agents, different inert fillers or other types of thermoplastic resins or rubbers, in order to confer high impact properties.

The compositions of the present invention may be used for manufacturing a variety of shaped articles by injection molding or by extrusion; in particular car parts, electronic parts, and the like.

A few examples are recorded below in Table A; by way of illustration but not of limitation, in order still better to understand the present invention and to carry out the same.

Operative Conditions

The operative conditions common to all the examples, are as follows:
a predetermined amount of PET having an inherent viscosity of 0.78 dl/g, previously dried over 12 hours under vacuum at 120° C., was admixed in a mixer with an amount of a nucleating agent, according to the ratios set forth in Table A and the obtained mixture was extruded at 280° C.

The compounds were obtained from a ¾ inch extruder type HAAK RHEOCORD EC.

The control of the samples thus obtained was carried out by a differential colorimeter (DSC-7 PERKIN ELMER), by operating on specimens made amorphous and carrying out a planned increase until melting and subsequent fall, in order to record the crystallization temperature in the melted state.

The cold crystallization temperature was recorded during the increase phase. The temperature was recorded in coincidence with the peak maximum. Inherent viscosity ($\eta$) was measured on a 60:40 mixture of phenol and tetrachloroethane, at 30° C., at a concentration of 0.25 g/dl.

EXAMPLES 1-3

Examples 1-3 refer to control samples.

Example 1 in Table A, refers to the matrix without additives.

Example 2 refers to the effects coming from the addition of sodium benzoate, a nucleating agent of customary type.

Example 3 describes the action of sodium p-hydroxybenzoate as such (basic product to obtain the nucleating agents set forth in the examples).

EXAMPLES 4-6

Examples 4-6 show that a nucleating agent with epoxide terminal groups acts, in proportion to the introduced amount, both on the cold crystallization temperature by lowering it (plasticizing effect) and on the crystallization in the melted state by increasing it (nucleating effect).

Moreover, the epoxide groups may have a regrading effect during the processing phase.

EXAMPLES 7-9

In Examples 7, 8 and 9, the ester type (acetate) termination of the polyoxyethylene chains shows a sharper action on the cold crystallization temperature, when compared with the epoxide ending.

EXAMPLE 10

The benzylene ether ending of Example 10 gives effects which are comparable with those of Example 9.

EXAMPLES 11-14

In Examples 11-14 the molecular weight of the epoxide chain was lowered in a drastic way, in order to check the capability of nucleation.

Examples 11-12 refer to a nucleating agent provided with alcohol group termination and it will be noted that the nucleant capability is excellent; plasticization is low, owing to the lower contribution of polyethylene glycol; inherent viscosity turns out to be lower owing to possible reactions of transesterification of the alcoholic function.

Examples 13-14 show the improvement on the viscosity effects, coming from the urethanic termination of the additive.

TABLE A

| Example | Test | Additive (%) | NA (%) | Cold Crystallization Temperature* | Temperature of Cold Crystallization in the Melted State | ηinh (dl/g) |
|---|---|---|---|---|---|---|
| 1 | PET as such | 0 | 0 | 138 | 188 | 0.78 |
| 2 | PET + sodium benzoate | 0.313 | 0.050 | 132 | 203 | 0.65 |
| 3 | PET + sodium p-hydroxybenzoate | 0.300 | 0.043 | 134 | 205 | 0.66 |
| 4 | PET + NaOC—⌬—(OCH₂CH₂)₉₀OCH₂CH—CH₂ (epoxide) | 2.5 | 0.014 | 122 | 210 | 0.67 |
| 5 | PET + NaOC—⌬—(OCH₂CH₂)₉₀OCH₂CH—CH₂ (epoxide) | 5.0 | 0.028 | 117 | 214 | 0.64 |
| 6 | PET + NaOC—⌬—(OCH₂CH₂)₉₀OCH₂CH—CH₂ (epoxide) | 7.5 | 0.042 | 113 | 216 | 0.62 |
| 7 | PET + NaOC—⌬—(OCH₂CH₂)₉₀OCCH₃ | 2.5 | 0.014 | 120 | 211 | 0.68 |
| 8 | PET + NaOC—⌬—(OCH₂CH₂)₉₀OCCH₃ | 5.0 | 0.028 | 111 | 215 | 0.66 |
| 9 | PET + NaOC—⌬—(OCH₂CH₂)₉₀OCCH₃ | 7.5 | 0.042 | 109 | 216 | 0.65 |
| 10 | PET + NaOC—⌬—(OCH₂CH₂)₉₀O—CH₂—⌬ | 7.5 | 0.040 | 108 | 215 | 0.61 |
| 11 | PET + NaOC—⌬—(OCH₂CH₂)₂₀OH | 0.45 | 0.010 | 126 | 209 | 0.63 |
| 12 | PET + NaOC—⌬—(OCH₂CH₂)₂₀OH | 1.0 | 0.022 | 119 | 217 | 0.56 |
| 13 | PET + NaOC—⌬—(OCH₂CH₂)₂₀OC—NHC₁₈H₃₇ | 0.5 | 0.0086 | 128 | 206 | 0.70 |
| 14 | PET + NaOC—⌬—(OCH₂CH₂)₂₀OC—NHC₁₈H₃₇ | 1 | 0.017 | 126 | 209 | 0.67 |

*Temperature measured at the peak maximum by means of calorimeter DSC-7 Perkin Elmer.

What is claimed is:

1. Quickly crystallizing polyester compositions comprising a mixture comprising a polyester thermoplastic resin and a nucleating agent, comprising selecting the nucleating agent from the group consisting of salts or mixtures of salts of organic acids having the formula:

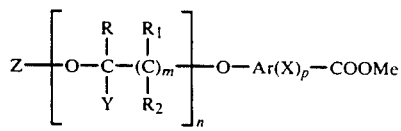

(I)

wherein:

Me is an alkali metal or an alkaline earth metal;
X is a group selected from

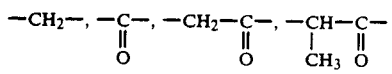

p is 0 or 1;

Ar is a single or condensed aromatic ring having from 6 to 14 carbon atoms, which may also be substituted with halogen atoms, $C_1$-$C_8$ alkyl groups, $C_1$-$C_8$ alkoxy groups, nitro groups; or Ar represents 2 or more aromatic nuclei, each of them having from 6 to 14 carbon atoms, linked either by a single bond or by an —O—, —S—, —SO$_2$—, —SO—, —CO—, —CS—, or —NH— group;

R, $R_1$, $R_2$, independently of one another are H, a linear or branched $C_1$-$C_6$ alkoxy groups;

Y is a group selected from H and —CH$_3$;

m is 1 when Y is —CH$_3$; or a whole number ranging from 1 to 5 independently in each instance when Y=H;

n is a number ranging from 1 to 500 independently in each instance; and

Z is a group selected from H, a $C_1$-$C_{18}$ alkyl, benzyl,

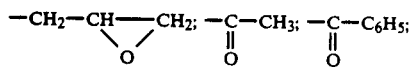

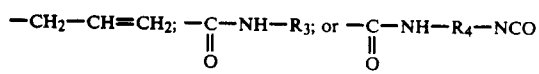

wherein $R_3$ represents a non-substituted phenyl group or a phenyl group substituted with halogen atoms or a $C_{10}$-$C_{40}$ alkyl group; $R_4$ represents a non-substituted phenylene group or a phenylene group substituted with halogen atoms or a $C_{10}$-$C_{40}$ alkylene group.

2. Compositions according to claim 1, wherein the nucleating agent is added in amounts ranging from 0.1 to 30% by weight, with respect to the resin.

3. Compositions according to claim 2, wherein the nucleating agent is added in amounts ranging from 0.2 to 15% by weight, with respect to the resin.

4. Compositions according to claim 1, 2 or 3, wherein the nucleating agent is added in the form of a master batch separately prepared.

5. Compositions according to claim 4, wherein the master batch is added in amounts ranging from 1 to 50% by weight, with respect to the resin.

6. Compositions according to claim 4, wherein the master batch is added in amounts ranging from 2 to 20% by weight, with respect to the resin.

7. Compositions according to claim 4, wherein the master batch is obtained by mixing the nucleating agent having formula (I) with a polyester resin in concentrations ranging from 0.5 to 20% with respect to the resin.

8. Compositions according to claim 4, wherein the master batch is obtained by mixing the nucleating agent having formula (I) with a polyester resin in concentrations ranging from 1 to 10% by weight, with respect to the resin.

9. Compositions according to claim 7, wherein the polyester resin of the master batch is selected from the group consisting of polyethylene terephthalate, polybutylene terephthalate, their mixtures or copolymers, or polyethylene terephthalate modified by introduction of polyoxyalkylene, polyarylate or polycarbonate segments.

10. Compositions according to claim 1, wherein in formula (I) p=0, Ar is a phenylene-1,4 group, R, $R_1$ and $R_2$ are H, and m = 1.

11. Compositions according to claim 1, 2 or 3, wherein in formula (I) Z is a glycidyl group.

12. Compositions according to claim 1, 2 or 3, wherein in formula (I) Z is a

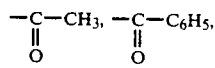

or an alkyl group.

13. Compositions according to claim 1, 2 or 3, wherein in formula (I) Z is a $C_1$-$C_{18}$ alkyl group or the —CH$_2$—C$_6$H$_5$ group.

14. Compositions according to claim 1, 2 or 3, wherein the thermoplastic polyester resin is polyethylene terephthalate.

15. Compositions according to claim 1, 2 or 3, to which inert fillers are added, selected from the group consisting of glass, carbon, boron fibers and/or inorganic particles of glass, mica, zeolites, graphite, or talc; organic fibers of aramide or polyacrylonitrile.

16. Compositions according to claim 1, 2 or 3, to which additives are added, said additives being selected from the group consisting of thermostabilizers, plasticizers, dyes and pigments, flame retardants, releasing agents, anti-oxidation agents and light stabilizers, and rubber.

* * * * *